Patented Dec. 30, 1952

2,623,909

UNITED STATES PATENT OFFICE 2,623,909

HYDROLYSIS OF 1,2-PROPYLENE OXIDE TO 1,2-PROPYLENE GLYCOL

Max O. Robeson and Thomas P. Webb, Corpus Christi, Tex., assignors to Celanese Corporation of America, New York, N. Y., a corporation of Delaware No Drawing. Application July 12, 1950, Serial No. 173,472

2 Claims. (Cl. 260—635)

This invention relates to the production of 1,2-propylene glycol and relates more particularly to an improved process for the hydrolysis of 1,2-propylene oxide whereby 1,2-propylene glycol may be obtained in an efficient and economical manner.

An object of this invention is to provide a process for hydrolyzing 1,2-propylene oxide employing an aqueous hydrolysis medium and elevated temperatures and pressures whereby maximum conversion to 1,2-propylene glycol may be achieved.

Another object of this invention is the provision of an improved process for the production of 1,2-propylene glycol by the hydrolysis of 1,2-propylene oxide in which side reactions resulting in the formation of dipropylene glycol are maintained at a minimum.

Other objects of this invention will appear from the following detailed description.

Aliphatic oxides may be hydrolyzed to the corresponding glycol by heating said oxides in an aqueous medium and in the presence of an acid hydrolysis catalyst. While aliphatic glycols may be readily obtained by this process, undesirable side reactions cause the formation of glycol ethers, thus reducing the yield of the desired glycol; moreover, the formation of said glycol ethers in appreciable amount complicates the recovery problem.

We have now found that 1,2-propylene glycol may be obtained efficiently and economically, in high yield and without the formation of excessive amounts of diproplyene glycol, by the hydrolysis of 1,2-propylene oxide if the hydrolysis of said oxide is effected at an elevated temperature and pressure in an aqueous medium maintained within a predetermined pH range and containing a controlled amount of water.

Thus, in accordance with our improved process we have found that the most advantageous results are obtained with respect to completeness of hydrolysis when the pH of the reaction mixture is maintained below a value of 6.5. When ordinary mild steel equipment is employed it is preferable that the pH of the aqueous hydrolysis medium be maintained between 6 and 6.5 since, when under these conditions, equipment corrosion is at a minimum. The use of stainless steel equipment, however, eliminates the problem of corrosion. The desired pH may be obtained readily by employing 1,2-propylene oxide containing from a trace to about 0.10% by weight of methyl formate or by employing an aqueous hydrolysis medium containing sufficient dissolved carbon dioxide to maintain the desired pH.

The amount of water present when effecting said oxide hydrolysis has been found to be critical if the amount of dipropylene glycol formed during the hydrolysis of 1,2-propylene oxide to 1,2-propylene glycol is to be held to a minimum. When less than 3 parts by weight of water for each part by weight of 1,2-propylene oxide is present an excessive amount of dipropylene glycol is formed. However, when the ratio of water to 1,2-propylene oxide employed is maintained between 3 to 5 parts by weight of water for each part by weight of 1,2-propylene oxide, the side reactions resulting in formation of dipropylene glycol are inhibited and the major portion of the 1,2-propylene oxide present is converted to the desired 1,2-propylene glycol. More than 5 parts by weight of water yields less glycol ethers, but results in a lower conversion of 1,2-propylene oxide in the same reaction period.

The preferred temperature at which the hydrolysis is effected is 125 to 160° C. and optimum results are achieved at a temperature of about 150° C. The hydrolysis reaction is preferably carried out under autogenous pressure which is of the order of about 125 to 200 pounds per square inch under the temperature conditions employed. By maintaining the aqueous reaction mixture under the above reaction conditions for a period of 60 to 120 minutes, the hydrolysis is completed.

In order further to illustrate our invention but without being limited thereto, the following examples are given:

Example I 100 parts by weight of 1,2-propylene oxide containing 0.05% by weight of methyl formate are mixed with 300 parts by weight of water to yield a reaction mixture having a pH of 4.7 and the resulting reaction mixture heated to a temperature of 150° C., at which temperature it is maintained for 60 minutes. 92% of the 1,2-propylene oxide is hydrolyzed and converted to glycols of which 88.5% is 1,2-propylene glycol and 11.5% dipropylene glycol.

Example II 100 parts by weight of 1,2-propylene oxide free of methyl formate are mixed with 400 parts by weight of water to yield a reaction mixture having a pH of 6.2 and heated to a temperature of 150° C. for 60 minutes. A pressure of about 170 pounds per square inch is reached during the heating. 89% of the 1,2-propylene oxide is hydrolyzed to glycols of which 87.3% is 1,2-propylene glycol and 12.7% dipropylene glycol.

*Example III*

100 parts by weight of 1,2-propylene oxide containing a trace of methyl formate are mixed with 500 parts by weight of water to yield a reaction mixture having a pH of 5.3 and the mixture then heated to a temperature of 125° C. for 60 minutes. A pressure of about 125 pounds per square inch is reached during said heating. About 82% of the 1,2-propylene oxide is hydrolyzed with 91.8% of the hydrolyzed 1,2-propylene oxide being converted to 1,2-propylene glycol and 8.2% being converted to dipropylene glycol.

It is to be understood that the foregoing detailed description is given merely by way of illustration and that many variations may be made therein without departing from the spirit of our invention.

Having described our invention, what we desire to secure by Letters Patent is:

1. In a process for the hydrolysis of 1,2-propylene oxide, the step which comprises heating 1,2-propylene oxide with from 3 to 5 parts by weight of water at an elevated temperature under autogenous pressure while maintaining the pH of the reaction medium at from 6 to 6.5 by having present in the reaction mixture a compound selected from the group consisting of methyl formate and carbon dioxide.

2. In a process for the hydrolysis of 1,2-propylene oxide, the step which comprises heating 1,2-propylene oxide with from 3 to 5 parts by weight of water at an elevated temperature of 125 to 160° C. for 60 to 120 minutes under autogenous pressure while maintaining the pH of the reaction medium at from 6 to 6.5 with the aid of dissolved carbon dioxide.

MAX O. ROBESON.
THOMAS P. WEBB.

REFERENCES CITED

The following references are of record in the file of this patent:

UNITED STATES PATENTS

| Number | Name | Date |
|---|---|---|
| 1,875,312 | Youtz | Aug. 30, 1932 |
| 2,108,936 | Ferrero et al. | Feb. 22, 1938 |
| 2,135,271 | Balcar | Nov. 1, 1938 |
| 2,472,417 | Gonze | June 7, 1949 |